March 25, 1952 — A. P. KRUEGER ET AL — 2,590,549
TAPE-SERVING MECHANISM
Filed Aug. 5, 1948 — 2 SHEETS—SHEET 1

Inventors
Alfred P. Krueger
and Oscar P. Erhardt
By
Rockwell & Bartholow
ATTORNEYS

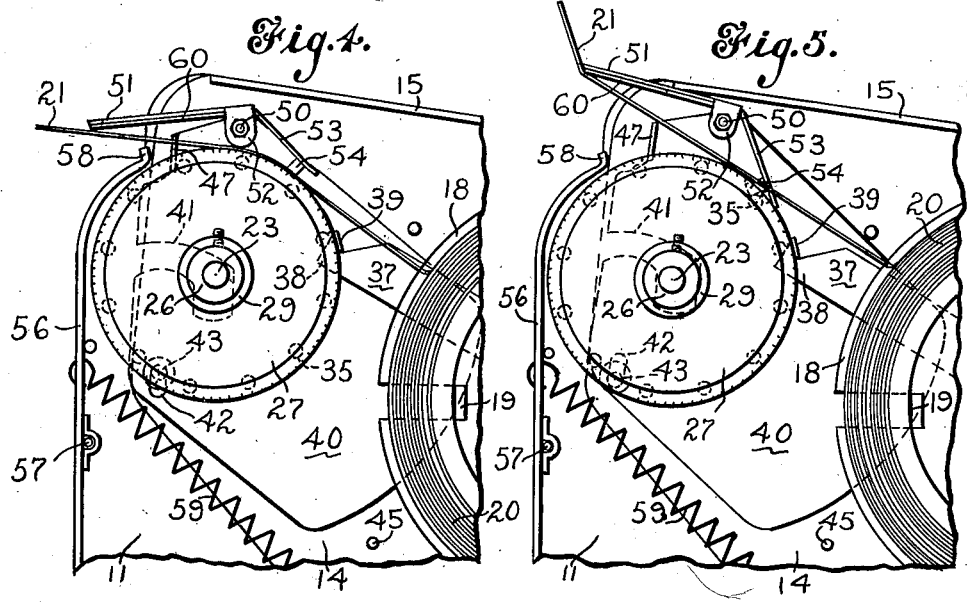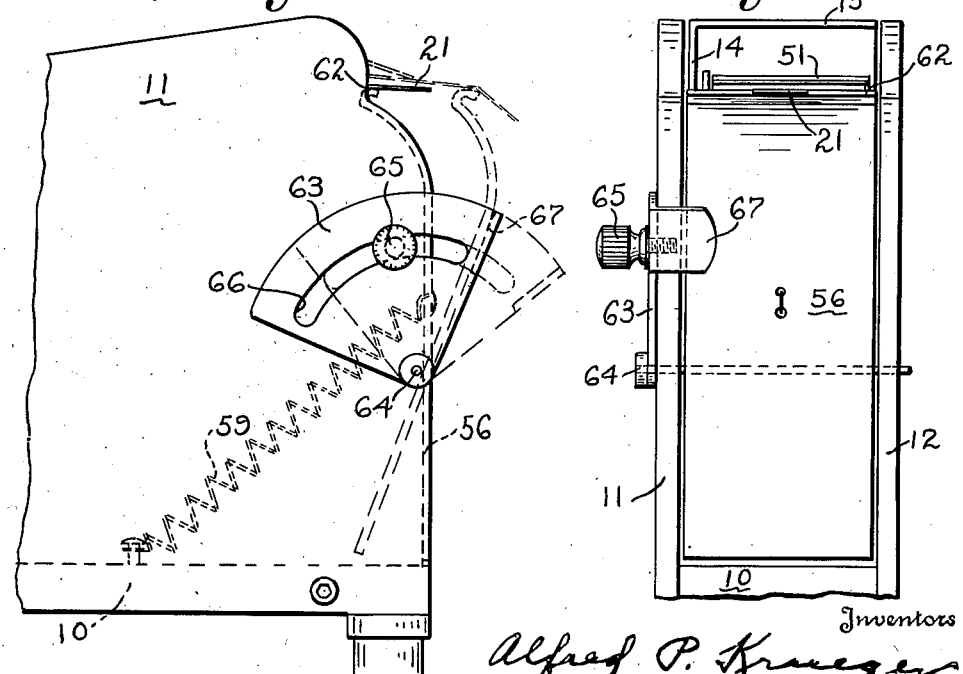

Patented Mar. 25, 1952

2,590,549

UNITED STATES PATENT OFFICE 2,590,549

TAPE-SERVING MECHANISM

Alfred P. Krueger, Stratford, and Oscar P. Erhardt, Derby, Conn., assignors to Derby Sealers, Incorporated, Derby, Conn., a corporation of Connecticut Application August 5, 1948, Serial No. 42,594

4 Claims. (Cl. 164—84.5)

This invention relates to tape-dispensing machines and more particularly to a machine for dispensing pressure-sensitive tape, which is tacky or clingable upon one surface.

The dispensing of such tape has presented certain difficulties in that, the tape being tacky, it will cling to any surface with which it comes in contact. Many of the suggested devices for dispensing tape of this kind comprise means for holding a supply roll of the tape in such a manner that the operator may grasp a free end of the tape and draw it from the supply roll by pulling on the free end. Due to the clingy nature of the tape, it is, of course, advantageous that the free end of the tape project from the machine so that it may be readily grasped by a finger or fingers of the operator.

It is also necessary to provide means for severing the dispensed portion of the tape, and as the tape may cling to the severing means, regardless of whether the latter is on the tacky side of the tape, it is convenient to so arrange the dispensing device that a short free end of the tape will normally project beyond the severing member. One means of effecting this result, which is exemplified in the present device, is to provide a severing member which will move forward with respect to the tape prior to the severing operation, and then move rearwardly after the severing operation, so as to expose a short length of tape.

In the present invention, the dispensing machine is provided with a drum with which the tape is engaged and over which the tape is trained when drawn from the roll. A severing member is mounted adjacent the drum, this severing member being in the form of a cutter, or blade, against which the tape may be drawn by the operator, to be severed. The severing blade is so arranged as to have a to-and-fro movement whereby it may be drawn forwardly as the tape is drawn forwardly, but will be caused to recede or move rearwardly after the severing operation takes place, and as means are provided for normally preventing rearward movement of the tape itself, a free end of the latter will be exposed to be grasped for the next operation.

One object of the present invention is to provide a new and improved machine for dispensing pressure-sensitive tape.

A further object of the invention is to provide a machine by which the tape may be dispensed by a direct pull of the operator on the end of the tape, but which will be so constructed that a short portion of the tape remaining upon the supply roll will project freely from the machine where it may be readily grasped by the operator for a succeeding operation.

A still further object of the invention is to provide a tape-dispensing machine of the character described whereby the severing member, or tear-off blade, will be movably mounted with respect to the frame of the machine, so that the serving blade will move forwardly and rearwardly, the blade being in a forward position during the severing operation and receding to a rearward position after the severing operation to expose the end of the tape remaining on the supply roll.

Still another object of the invention is to provide a tape-dispensing machine of the character described having a drum and a severing member mounted to move relatively to the drum, so that at the end of a feeding and severing operation, the severing member will move rearwardly and expose a length of tape to be engaged by the fingers of the operator.

To these and other ends the invention consists in the novel features and combinations of parts to be hereinafter described and claimed.

In the accompanying drawings:

Fig. 4 is a side elevational view of the feed mechanism showing the parts in a different position than that shown in Fig. 1;

Fig. 5 is a view similar to Fig. 4 showing the feed mechanism in the position occupied at the beginning of the severing operation;

Fig. 6 is a fragmentary side elevational view of a tape-dispensing machine of slightly modified form; and Fig. 7 is a front elevational view of the device shown in Fig. 6.

Figure 1:
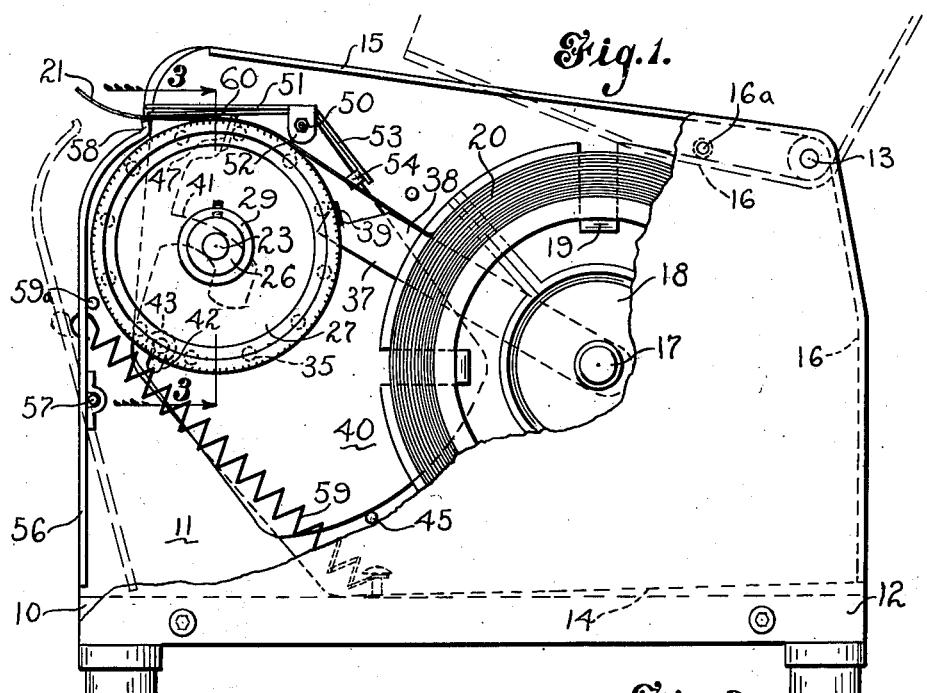
Fig. 1 is a side elevational view of a tape-dispensing machine embodying our invention, a part of the frame being broken away to show the interior mechanism.

To illustrate a preferred embodiment of our invention, we have shown a frame comprising a base 10 and a pair of upright side frame members or plates 11 and 12, these members being spaced apart so as to house the mechanism of the device therebetween.

An auxiliary frame, which carries the dispensing mechanism, is pivoted between the plates 11 and 12 on the pivot pin 13. This auxiliary frame comprises an upright plate 14 disposed adjacent the frame member 11, a cover plate 15 and a rear plate 16. This entire frame may be tilted rearwardly, as shown in dotted lines in Fig. 1, so as to bring the operating mechanism rearwardly and upwardly to a position above the plates 11 and 12. In this position, access may be had to the operating parts of the device, and also to the supply roll so that a new roll may be placed in position when necessary. This frame is held in this position by engagement of the plate 16 with a stop 16ᵃ on the member 12.

Rotatably mounted on a shaft 17, secured to the vertical plate 14 of the auxiliary frame, is a supply-roll holder 18, this holder being provided with laterally projecting spring fingers 19 upon which a supply roll 20 of tape may be mounted. The free end of the tape coming from the supply roll 20 is shown at 21, this free end being trained over a roller or drum which will now be described.

Figures 2, 3:
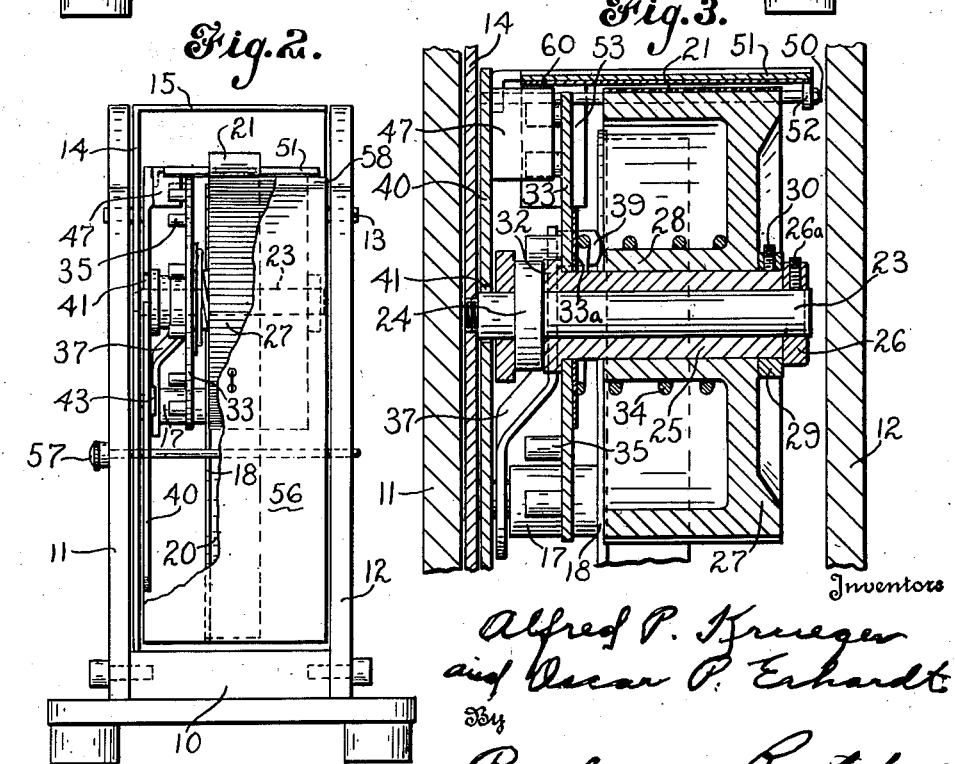
Fig. 2 is a front elevation view of the device with some parts broken away.
Fig. 3 is a sectional view on line 3—3 of Fig. 1.

Secured to the plate 14 is a shaft 23 (Fig. 3), this shaft being provided with an annular shouldered portion 24. A bushing 25 is rotatably mounted on the shaft 23 and held against the shoulder 24 by a collar 26, which is secured to the shaft by the set screw 26ᵃ.

Rotatably mounted on the bushing 25 is a roll or drum 27, this member being provided with a hub 28 resting upon the bushing 25. The roll 27 is held in place by a collar 29 secured to the bushing 25 by the set screw 30, it being understood, however, that the drum will normally be rotatable upon the bushing.

The bushing 25 is provided at its inner end with an enlarged or shouldered portion 32, and on this end of the bushing is rotatably mounted a disk 33, the disk being held against the shoulder 32 by a spring 34 which surrounds the hub 28 of the feed drum 27, and acts laterally against the washer 33ᵃ which abuts the disk 33. This disk is provided with a plurality of laterally projecting pins 35, the purpose of which will be explained hereinafter.

A stop pawl 37 is pivoted on the shaft 17 and the free end 38 of this pawl engages the pins 35 so as to prevent rearward motion (or clockwise motion as shown in Fig. 1) of the disk 33. The pawl 37 is provided with the laterally projecting ear 39 (Fig. 3) which rides on the periphery of the disk 33 and holds this pawl in position to engage the pins 35. It will be understood that the free end 38 of the pawl can move upwardly to permit the pins to pass, upon a forward or counter-clockwise rotation of the disk 33.

Adjacent the auxiliary frame member or plate 14, is disposed a carrier member 40 for supporting the severing member. This member is in the form of a sheet-metal plate and is held in place by means of a somewhat arcuate and L-shaped slot 41, in which the shaft 23 is received, and also by means of another slot 42 provided in the plate 40, this slot being somewhat elongated and receiving a pin or screw 43 secured in the plate 14.

It will be apparent that with this construction, the plate 40 is permitted a pivotal movement about the pin 43 as the arcuate portion of the slot 41 is described substantially on a center about this pin. It is also permitted an up-and-down movement allowed by the slot 42, which up-and-down movement is also permitted by the substantially vertical inner end portion of the slot 41. Normally the plate 40 rests against a stop 45, as illustrated in Fig. 1 of the drawings, the plate normally assuming this position when the device is at rest under the influence of gravity, and, it will be noted, that the pin 43 is at the upper end of the slot 42, and likewise the shaft 23 stands outwardly or to the left of the rear closed end of the arcuate portion of the slot 41.

Projecting inwardly from an upper corner of the plate 40 is a lug 47 designed to be engaged by the pins 35 on the disk during the rotation of the latter, as shown in Fig. 1. When these pins engage the lug 47, they tend to swing the plate 40 about the pin 43 from the position shown in Fig. 1 to the position shown in Fig. 4. In the latter position, the rotation of the plate 40 about the pin 43 will be stopped by the engagement of the rear end of the slot 41 with the shaft 23. It may here be noted that the spring 34 frictionally connects the drum 27 and the disk 33 so that normally the latter will be rotated when the drum 27 is rotated. However, when the forward movement of the plate 40 is stopped by the engagement of the shaft 23 with the rear end of the slot 41, the disk 33 will be held against rotation, and the drum will be permitted to continue to rotate in order to deliver as long a length of tape as desired.

Pivoted at 50 to the plate or carrier 40 is a severing member 51, the pivot pin 50 passing through an ear 52 attached to the blade 51, which is a flat member extending forwardly over the surface of the drum 27. Also secured to the severing member is a tail piece 53, provided with an inwardly extending lug or ear 54. The lower end of the tail piece 53 is adapted to engage the periphery of the disk 33 when the parts are in the position shown in Fig. 5, and thus limit the upper swinging movement of the severing member on the carrier plate 40 about the pivot 50. At this time, it will be noted from Fig. 5 that the lug 54 is in engagement with the forward edge of one of the pins 35, thus preventing rearward movement of the carrier plate and the severing member 51 carried thereby.

At the front of the frame is a frame member 56 pivoted to the standards 11 and 12 on the pivot pin 57 so that this member will swing from the full-line position, shown in Fig. 1, to the dotted-line position shown in this figure. The upper end 58 of this member is disposed substantially vertically and underlies a portion of the tape 21 closely adjacent the lower surface of the knife of the severing member 51. The free end of the tape clings to this upper edge 58 and prevents any backlash in the drum 27. Usually in the operation of the machine the tape will be pulled upwardly and disengaged from the edge 58. The member 56 may swing to the dotted-line position shown in Fig. 1 to permit the auxiliary frame to swing upwardly. It will be returned to its normal position against a stop 59ᵃ by the spring 59.

It may also be noted that below the severing knife 51 is a resilient stripper member 60. This member is secured to the severing member 51 adjacent its rear edge, and at its front edge stands in a spaced position with respect to the front edge of the severing member due to its inherent resiliency, so that while it will move up against the severing member to permit the tape to be severed, it will spring downwardly to strip the tape from the edge of the severing member.

In Figs. 6 and 7 of the drawing, we have shown a device by which the length of tape dispensed by the machine may be measured if this is desired. In this case, the swinging front casing member 56 may be provided with a relatively broad upper surface 62, so as to provide increased area for the clinging thereto of the tape in order that when the tape is pulled forwardly in a substantially horizontal direction, the member 56 will be pulled forwardly to the dotted-line position shown in Fig. 6. A quadrant 63 is pivoted at 64 to the frame plate 11, the quadrant being secured in any desired position of an adjustment by a set screw 65 engaged with the frame member 11, the set screw being received in an arcuate slot 66. The quadrant 63 is also provided with a laterally extending stop member 67 projecting forwardly of the member 56, so that the latter will be stopped in any desired position of adjustment depending upon the length of the strip of tape it is desired to use. As the tape clings to the upper end 62 of the member 56 and the latter is drawn outwardly with the tape, the forward movement of the tape will be stopped when the member 56 strikes the stop 67, and thus the length of the dispensed strip will be limited.

The operation of the device is as follows:

When the parts are at rest they are in the positions shown in Fig. 1, and the end 21 of the tape is engaged with the periphery of the drum or roller 27 below the knife or severing member 51. It will be noted that, as shown in Fig. 1, the extreme free end of the tape projects beyond the front end of the member 56, so that it may readily be grasped by the fingers. When the operator grasps this free end of the tape and draws it forwardly, the drum 27 will be rotated upon the shaft 23 by reason of the fact that the tacky side of the tape clings to the drum. Due to the frictional driving connection between the drum and the disk 33 through the spring 34, the disk will also be rotated and, as one of the pins 35 is in engagement with the lug 47 on the plate 40, this plate will be carried forwardly as permitted by the slot 41 to the position shown in Fig. 4. During this movement, the plate will swing about the pin or screw 43. At this time, the rear edge of the slot will abut the shaft 23 and the swinging movement of the plate will be halted. This will also stop the rotation of the disk 33, as a pin 35 will still be in engagement with the lug 47, but it will be understood that the drum 27 will continue to rotate so that the proper length of tape may be drawn from the supply roll 20. Reverse movement of the disk 33 is, of course, prevented by the pawl 37 and the frictional connection between this disk and the drum 27 also normally prevents reverse rotation of the drum when the operator ceases to pull upon the tape.

When sufficient tape has been drawn from the supply roll, and the parts of the device are in the position shown in Fig. 4, the operator draws the free end of the tape upwardly against the edge of the severing member 51, as shown in Fig. 5. When the upper surface of the tape strikes the lower edge of the severing member, the latter is first moved about its pivot 50 from the position shown in Fig. 4, to that shown in Fig. 5, wherein the tail piece 53 on the severing member engages the periphery of the disk 33. This limits the movement of the severing member relatively to the carrier plate 40, and a continued upward pull on the tape moves the carrier plate upwardly to the limit permitted by the slot 42. As the severing member 51 can move no further and is held rigidly in this position, the tape may be severed against the forward edge of this member. During the upward movement of the member 40, the lug 47 is disengaged from the pin 35, as shown in Fig. 5, but the carrier plate, of which this lug is a part, will be prevented from rearward movement due to the engagement of the member 54 in front of one of the pins 35, so that the carrier member 40, together with the knife 51, will be held in the forward position shown in Fig. 5.

As soon, however, as the tape is severed and the plate 40 relieved of the upward-lifting force, due to the pull upon the free end of the tape, this plate drops downwardly, due to its weight, thus permitting the shaft 23 to enter the arcuate portion of the slot 41 and, at the same time, the forward end of the severing member 51 drops downwardly by gravity about the pivot 50, so as to release the lug 54 from the pin 35 with which it is engaged. The carrier plate 40 now swings rearwardly about the pin 43, due to its weight, to its original position shown in Fig. 1. During this rearward swinging movement of the carrier plate, it will be seen that the severing member has also moved rearwardly so as to expose a portion of the free end of the tape, as shown in Fig. 1, in order that it may readily be grasped by the operator.

It may also be noted that immediately upon the severing of the tape, the forward end of the severing member 51 will drop downwardly prior to the rearward movement of the carrier plate 40. This serves to "slap" the free end of the tape downwardly upon the upper edge 58 of the member 56, this member being in the full-line position shown in Fig. 1, so that the tape will normally adhere to the upper edge of this member and the free end thereof extend outwardly therefrom, to be grasped by the operator.

If it is desired to measure the dispensed strip, the tape will be pulled in a substantially horizontal direction and, as shown in Figs. 6 and 7, will cling to the surface 62 and thus draw the member 56 outwardly as permitted by the setting of the stop 67.

While we have shown and described some preferred embodiments of our invention, it will be understood that it is not to be limited to all of the details shown, but is capable of modification and variation within the spirit of the invention and within the scope of the claims.

What we claim is:

1. Mechanism for dispensing pressure-sensitive tape comprising a frame, a drum rotatably mounted on the frame to which the tape adheres, a carrier member adjacent the drum, means for mounting said member on the frame for movement relatively to the axis of said drum, means actuated by the rotation of the drum in a forward direction to move said carrier member in the general direction in which the tape is drawn, a severing member swingably mounted on the carrier, and means on said severing member to restrain said carrier member against reverse movement during the severing operation.

2. A machine for dispensing pressure-sensitive tape comprising a frame, a drum rotatably mounted on the frame to which the tape adheres, a carrier member, means mounting said member on the frame for movement relatively to the axis of the drum, means rotatable with said drum and adapted to engage a part of said member and move it in a tape-feeding direction when said drum is rotated, and a severing member pivotally mounted on said carrier member and having a part engageable with said rotatable means to restrain said carrier member against movement in a reverse direction.

3. A machine for dispensing pressure-sensitive tape comprising a frame, means rotatably mounted on the frame to which the tape clings as it is drawn from the roll, a carrier member, means mounting said carrier member for pivotal movement relatively to the axis of the rotatable means and for movement in a substantially vertical direction, a severing member pivotally mounted on said carrier member, an actuating member rotatably mounted on the axis of the rotatable means and rotated by said rotatable means, interengaging means on the actuating member and carrier member to move the latter, means for checking forward movement of the carrier member, and inter-engaging means on said severing member and actuating member to limit pivotal movement of the severing member and prevent rearward movement of the carrier member during the severing operation.

4. A machine for dispensing pressure-sensitive tape comprising a frame, means rotatably mounted on the frame to which the tape clings as it is drawn from the roll, a carrier member, means mounting said carrier member for pivotal movement relatively to the axis of the rotatable means and for movement in a substantially vertical direction, a severing member pivotally mounted on said carrier member, an actuating member rotatably mounted on the axis of the rotatable means and rotated by said rotatable means, interengaging means on the actuating member and carrier member to move the latter, means for checking forward movement of the carrier member, interengaging means on said severing member and actuating member to limit pivotal movement of the severing member and prevent rearward movement of the carrier member during the severing operation, and said carrier member being biased by gravity toward its lower position.

ALFRED P. KRUEGER.
OSCAR P. ERHARDT.

REFERENCES CITED

The following references are of record in the file of this patent:

UNITED STATES PATENTS

| Number | Name | Date |
|---|---|---|
| Re. 22,732 | Krueger | Mar. 19, 1946 |
| Re. 22,733 | Krueger | Mar. 19, 1946 |
| Re. 22,981 | Fitch | Mar. 9, 1948 |
| 2,138,338 | Casasco | Nov. 29, 1938 |
| 2,193,759 | Birr | Mar. 12, 1940 |
| 2,275,409 | Anderson | Mar. 10, 1942 |
| 2,324,349 | Atkins | July 13, 1943 |
| 2,522,047 | Krueger et al. | Sept. 12, 1950 |